Patented Oct. 25, 1949

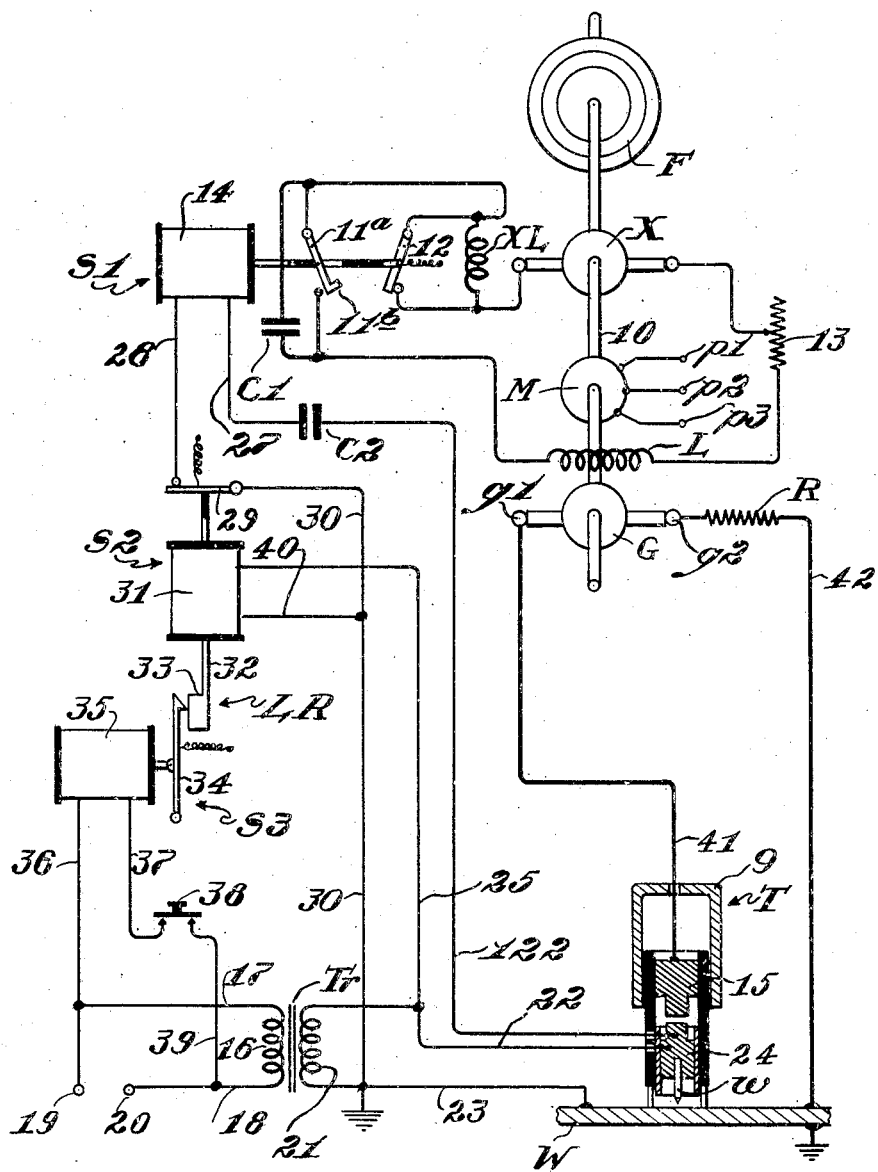

2,486,274

UNITED STATES PATENT OFFICE 2,486,274

WELDING GENERATOR SAFETY CIRCUIT

Harold J. Graham, Boston, Mass., assignor to Graham Manufacturing Corporation, Detroit, Mich., a corporation of Michigan Application May 1, 1948, Serial No. 24,505

9 Claims. (Cl. 219—4)

This invention relates to a system for supplying welding current to a percussion welding tool.

Electrical generating systems for supplying a welding current to welding apparatus normally produce relatively high potentials between the welding electrodes (one of which is attached to a hammer if the welding apparatus is a percussion tool) during an open circuit condition when a weld is not being made. After striking an arc in a welding operation, the resulting large flow of current reduces the potential across the welding electrodes considerably. In certain types of stud welding where a percussion tool is used to weld a stud electrode to a larger workpiece, it is desirable in order to obtain advantageous wave form characteristics for the welding current, to disconnect the welding circuit immediately following the contact of the workpieces, namely the stud and the part to which it is welded. The switching contactors in the main welding circuit previously provided to obtain this function have not been entirely satisfactory because of the large amount of current passing through the circuit at the time of interruption.

Objects of this invention are to provide an electrical system which will deenergize the welding circuit immediately following the contacting of the workpieces, which does not require large circuit interrupting contacts or switches and which is safe and efficient in operation.

A further object is to provide a control circuit which is self-supervising and deenergizes the welding circuit either upon the breaking of a control lead or upon the failure of the workpieces to make electrical contact.

In a broad aspect the invention contemplates an electrical system for supplying power to a pair of welding electrodes comprising a welding circuit, an exciting circuit and a control circuit. The welding circuit includes a generator connected to the electrodes or workpieces. The field winding of the generator is energized either from the generator or a separate power source by means of the exciting circuit which can be interrupted by a switching element. A control circuit responsive to the contacting of the electrodes upon the completion of the welding circuit actuates the switching element to interrupt the control circuit and thereby to deenergize the generator.

In a more specific aspect the exciter circuit and the field winding are energized by an exciting generator through a normally open contact. A solenoid for closing the normally opened contact in the exciter circuit, is connected in the control circuit in parallel with the welding electrodes and a control power source. In response to the contacting of said electrodes upon the completion of the welding circuit the solenoid is shunted so that the exciting circuit is opened to deenergize the welding generator.

In another aspect the exciting generator is of the type having a self-exciting field connected in series with the exciter circuit and shunted by a normally closed contact. This contact is opened by the energization of the solenoid in the control circuit and is arranged so that it is closed to shunt the field before the normally open contact in series with the exciting circuit is opened upon the deenergization of the solenoid.

In still another aspect the control circuit for operating the contact or contacts described heretofore comprises a contact operating solenoid and a control power source connected in series with one of the electrodes, preferably the ungrounded one. The grounded electrode is linked to the junction comprising the common connection between the solenoid and the control power source. In this manner two leads connect with the electrode and the circuit completed thereby is self-supervising so that the breaking of either of such leads deenergizes the solenoid and the welding circuit whereas if only one lead for shunting the solenoid is used, the breaking thereof results in continuous energization of the solenoid and of the welding circuit.

In a further aspect the armatures of the welding and exciting generators and a flywheel are mounted on a common shaft driven by a motor so that these rotating members store mechanical energy during the no load periods which energy is absorbed by the electrical system during the peak load periods. This peak load occurs as a high current inrush during the short time period between the contacting of the electrodes or workpieces to complete the welding circuit and the deenergization of such circuit by the shunting of the solenoid to deenergize the welding generator field winding. By the use of the mechanically stored energy during the peak load periods both the peak power required from an external power source and the power ratings of the motor and welding generator are appreciably reduced.

In another specific aspect the invention contemplates a welding circuit including a welding generator the terminals of which are connected respectively to a grounded workpiece and a plunger of a welding hammer. The generator is excited by a circuit including a field winding for magnetizing the welding generator, an exciting generator and a normally opened contact connected in series. The contact is closed by a solenoid connected in a control circuit in series with a control power source and the percussion block of the welding hammer which holds a second workpiece such as a stud. The first workpiece is linked with the junction comprising the common connection of the solenoid and the power source. By so connecting the control circuit in series with the percussion block of the hammer, the solenoid is deenergized to interrupt the exciting circuit, by the accidental breaking of either of the leads to the percussion block so that the solenoid and the welding circuit are deenergized.

In an additional aspect a normally closed contact of a latching relay is connected in series with the control circuit. The terminals of the latching relay operating coil are connected between the grounded workpiece and the percussion block of the hammer which holds the other workpiece. This coil opens the normally closed contact only in response to a potential greater in magnitude than that of the control power source. If the workpiece held by the percussion block fails to contact the grounded workpiece thus to complete the welding circuit when struck by the plunger, the coil terminals are connected across the open circuit potential of the welding generator. This potential is of sufficient magnitude to energize the latching relay coil so that the latching relay contacts open to interrupt the control circuit and to deenergize the control solenoid. The resulting operation of the contact or contacts in the exciting circuit opens the field deenergizing the welding generator.

Other objects and aspects will be apparent with reference to the following specifications and drawing of a specific embodiment in which drawing the single figure is a wiring diagram of an electrical system according to the invention connected to an impact welding hammer.

In the embodiment of the invention chosen for the purpose of illustration, the welding circuit comprises a separately excited welding generator with an armature G connected by means of a terminal $g1$ and a lead 41 to a plunger 15 of a welding hammer T. A second generator terminal $g2$ is linked with one end of a current limiting resistor R. The opposite end of the resistor R is connected to a large workpiece W by a lead 42. As described in detail in my copending application Serial No. 700,136, filed Sept. 28, 1946, the welding is completed by depressing a hammer-housing 9 to release the plunger 15. A compressed spring (not shown) moves the plunger 15 to contact a percussion block 24 wherein is held a small workpiece such as a stud $w$. The momentum of the plunger 15 drives the percussion block 24 downwardly so that the stud $w$ strikes the workpiece W to complete the welding circuit. It will be understood that the percussion apparatus can be operated in any convenient manner; for example, the releasing and driving operations can be performed by pneumatic or hydraulic devices.

The armature member G of the welding generator is driven by a shaft 10 of an electric motor M. An armature member X of an exciting generator and a flywheel F are also carried by the shaft 10. The motor M is connected to the terminals $p1$, $p2$ and $p3$ of a main power source which is not shown.

The shunt field winding L for magnetizing the welding generator is energized by power from the exciting generator through a series exciting circuit which includes the welding generator shunt field winding L, a field rheostat 13, the exciter generator armature X, a series field winding XL for magnetizing the exciting generator and the normally open contacts 11a and 11b of a switching element such as the relay S1. To prevent arcing the contacts 11a and 11b are paralleled by a capacitor C1. Upon the energization of a solenoid 14 as will be described hereinafter, the contacts 11a and 11b are closed and a normally closed contact 12 shunting the series field winding XL is opened. When the solenoid 14 is deenergized, the relay S1 is arranged so that the contact 12 closes first and the contact 11a subsequently breaks with the contact 11b so that the series field winding XL is shunted before the exciting circuit is interrupted.

The energization of the relay solenoid 14 is completed through a control circuit including the solenoid 14, a wire 27, a blocking capacitor C2, a lead 122, the hammer percussion block 24, a lead 22, a low voltage secondary winding 21 of a saturated core transformer $Tr$, a wire 30, a normally closed contact 29 of a latching relay S2 and a wire 28. The capacitor C2 is connected in series with the control circuit so that the direct current from the welding circuit does not energize the solenoid 14 when the plunger 15 strikes the percussion block 24. The grounded end of the secondary winding 21 also is connected to the workpiece W by a lead 23. The primary winding 16 of the transformer $Tr$ is connected to the terminals 19 and 20 of a control power source (not shown) by the wires 17 and 18 respectively.

One terminal of coil 31 of the relay S2 is connected to the hammer percussion block 24 by the leads 25 and 22. The other terminal of the coil 31 is joined to the workpiece W by the wires 40, 30 and 23. The armature 32 of the relay S2 is provided with a latching arrangement LR so that after being opened by the energization of the coil 31, the contact 21 remains in such position until released manually as will now be described.

The latching arrangement LR comprises a stepped portion of the relay armature 32 with a surface 33 for engaging a spring-biased detent 34 which is linked mechanically to the armature of a relay S3. One terminal of a coil 35 of the relay S3 is connected to the control power source terminal 19 by a wire 36. The other coil terminal is linked with the control power source terminal 20 by means of a wire 37, a normally open push button 38 and the wires 39 and 18.

When the system is in operation the transformer $Tr$ and the control circuit are continually energized so that the solenoid 14 opens the contact 12 to remove the shunt from the field winding XL and closes contacts 11a and 11b to complete the exciting circuit of the welding generator. The rheostat 13 is adjusted until the open circuit voltage between the terminals $g1$ and $g2$ is approximately 100 volts.

As described heretofore the welding circuit is completed when the plunger 15 is released by the hammer housing 9 and strikes the percussion block 24 thereby to drive the stud $w$ against the workpiece W. In addition to completing the welding circuit the resulting electrical connection between the stud $w$ and the workpiece W places a short circuiting shunt in parallel with the transformer secondary winding 21 and the solenoid 14 by means of the leads 22 and 23. This shunt reduces the current flowing through the solenoid 14 substantially to zero thus releasing the armature of the relay S1. High saturation of the suitably dimensioned transformer core prevents the burning out of the primary winding 16 during this overload condition. As a result of the deenergization of the solenoid 14, the contact 12 is closed first thereby shunting the series field winding XL to deenergize the exciting generator and the connected exciting circuit so that the subsequent opening of the contacts 11a and 11b does not result in the interruption of the full field excitation current of the winding L. The opening of contacts 11a and 11b connects the field winding L and the capacitor C1 in series so that the energy stored in the field winding is dissipated through the capacitor.

As the above described switching sequence removes the excitation from the welding generator substantially immediately after the contacting of the workpieces w and W, it is apparent that although the welding current is of large magnitude the duration of the current flow is very short so that the average power required is small. By the use of the flywheel F a high rotational inertia is introduced into the rotating mechanical system so that energy is stored therein during the no load period during which no welding current is drawn. This energy is absorbed by the electrical system during the peak load period so that it is possible to use a motor M and a welding generator of smaller ratings than would otherwise be required to supply sufficient power to meet the peak load requirement.

If for any reason the stud w does not make electrical contact with the workpiece W when the percussion block 24 is struck by the plunger 15, the open circuit potential of the welding generator is applied between the stud w and the workpiece W. This potential of approximately 100 volts is sufficiently high to endanger operating personnel if they come in contact therewith and to cause arcing and burning of the workpieces. A potential of such magnitude energizes the coil 31 to open the contact 29 and thereby to deenergize the control circuit and the solenoid 14. The deenergization of the solenoid 14 interrupts the welding circuit, as described heretofore, thus eliminating both the danger to operating personnel and the burning of the work by arcing.

The latching arrangement LR restrains the contact 29 in the open position, thus maintaining deenergization of the welding circuit until released by the relay S3. After the trouble has been eliminated, the coil 35 is energized from the control power source terminals 19 and 20 by manually closing the push button 38 to release the latching arrangement LR so that the contact 29 closes.

Because of the severe operating conditions to which welding apparatus is subjected, there is always the possibility of breakage of the control leads to the hammer T. To prevent the loss of control if such a break occurs, the control circuit is made self-supervisory by completing the connection of the solenoid 14 to the transformer secondary 21 through the percussion block 24 by means of the leads 22 and 122 so that the breaking of either lead deenergizes the solenoid 14 and the welding circuit in the manner described above.

It should be understood that the present disclosure is for the purpose of illustration only and that this invention includes all modifications and equivalents which fall within the scope of the appended claims.

I claim:

1. An electrical system for supplying power to a pair of welding electrodes comprising a welding circuit having a generator connected with said electrodes, an exciting circuit including a field winding for magnetizing said generator, a switching element for interrupting the exciting circuit, and a control circuit responsive to the electrically effective contacting of said electrodes for causing the switching element to interrupt the exciting circuit whereby the weld is completed by energy supplied from the generator during the collapse of the magnetic field of the winding.

2. An electrical system for supplying power to a pair of welding electrodes comprising a welding circuit having a separately excited generator connected to said electrodes, an exciting circuit including a field winding for magnetizing said generator and a direct power source for energizing said winding, a switching element for disconnecting the winding from said source, and a control circuit responsive to the electrically effective contacting of said electrodes for causing the switching element to interrupt the exciting circuit whereby the weld is completed by energy supplied from the generator during the collapse of the magnetic field of the winding.

3. An electrical system for supplying power to a pair of welding electrodes comprising a welding circuit having a separately excited welding generator connected to said electrodes, an exciting circuit including a field winding for magnetizing the welding generator, an exciting generator for energizing said winding and a normally opened contact connected in series, and a control circuit including a solenoid for closing said contact and a control power source connected in parallel with said electrodes whereby responsive to the contacting of said electrodes upon the completion of the welding circuit, the solenoid is shunted thereby opening the exciting circuit to deenergize the welding generator, the weld being completed by energy supplied from the generator during the collapse of the magnetic field of the winding.

4. An electrical system for supplying power to a pair of welding electrodes comprising a welding circuit having a welding generator with a separately excited field winding and an armature member connected to said eletrodes, an exciting generator with an armature member for energizing said field winding, a motor for rotating said armature members, a normally open contact for connecting the exciting generator armature member to said field winding, a control circuit including a solenoid for closing said contact and a control power source connected in parallel with said electrodes, and a flywheel member rotated by said motor so that the energy stored in said rotating members during the no load period is absorbed by the electrical system to reduce the power required during the momentary peak load period between the contacting of the electrodes to complete the welding circuit and the deenergization of the welding circuit by the shunting of the solenoid.

5. An electrical system for supplying power to a pair of welding electrodes comprising a welding circuit having a separately excited welding generator connected to said electrodes, an exciting circuit including a shunt field winding for magnetizing the welding generator, an exciting generator for energizing the shunt field winding, a series field winding for magnetizing the exciting generator and a normally opened contact connected in series, a normally closed contact connected in parallel with the series field winding, and a control circuit including a solenoid for operating said contacts successively and a control power source connected in parallel with said electrodes whereby responsive to the contacting of said electrodes upon the completion of the welding circuit the solenoid is deenergized thereby first shunting the series field winding and subsequently opening the exciting circuit to deenergize the welding generator, the weld being completed by energy supplied from the generator during the collapse of the magnetic field of the shunt winding.

6. An electrical system for supplying power to a pair of welding electrodes comprising a welding circuit having a separately excited welding generator connected to said electrodes, an exciting circuit including a field winding for magnetizing the welding generator, an exciting generator for energizing said winding and a normally opened contact in series, and a control circuit including a solenoid for closing said contact, a control power source and one of said electrodes connected in series, the other electrode being linked to the common connection of the solenoid and the power source whereby the breaking of the leads to the first electrode deenergizes the solenoid thereby opening the exciting circuit to deenergize the welding generator.

7. An electrical system for supplying power to a workpiece and a welding hammer of the type having a plunger for holding another workpiece, and a normally open switch having two contacts one of which is connected to said plunger, said system comprising a welding circuit including a separately excited welding generator with terminals connected to the first of said workpieces and the other contact respectively, an exciting circuit including a field winding for magnetizing the welding generator, an exciting generator for energizing said winding and a normally opened contact connected in series, and a control circuit including a solenoid for closing said contacts, a control power source and said plunger connected in series the first of said workpieces being linked to the common connection of the solenoid and the power source whereby either the breaking of one of the leads to the plunger or the contacting of the workpieces upon the completion of the welding circuit deenergizes the solenoid thereby opening the exciting circuit to deenergize the welding generator, the weld being completed by energy supplied from the generator during the collapse of the magnetic field of the winding.

8. An electrical system for supplying power to a workpiece and a welding hammer of the type having a plunger and a percussion block for holding another workpiece, said system comprising a welding circuit including a separately excited welding generator with terminals connected to the first of said workpieces and said plunger respectively, an exciting circuit including a field winding for magnetizing the welding generator, an exciting generator for energizing said winding and a normally opened contact connected in series, and a control circuit including a solenoid for closing said contacts, a control power source and said percussion block connected in series the first of said workpieces being linked to the common connection of the solenoid and the power source whereby either the breaking of one of the leads to the percussion block or the contacting of the workpieces upon the completion of the welding circuit deenergizes the solenoid thereby opening the exciting circuit to deenergize the welding generator, the weld being completed by energy supplied from the generator during the collapse of the magnetic field of the winding.

9. An electrical system for supplying power to a workpiece and a welding hammer of the type having a plunger and a percussion block for holding another workpiece said system comprising a welding circuit including a separately excited welding generator with terminals connected to the first of said workpieces and said plunger respectively an exciting circuit including a field winding for magnetizing the welding generator, an exciting generator for energizing said winding and a normally opened contact connected in series a control circuit including a solenoid for closing said normally opened contact, a control power source connected in parallel with said workpieces and a latching relay with a normally closed contact connected in the control circuit and a coil for opening said normally closed contact responsive only to a potential greater in magnitude than that of the control power source potential connected between the first workpiece and the percussion block whereby upon the failure of the workpieces to contact to complete the welding circuit when the plunger strikes the percussion block the open circuit potential thereof energizes the latching relay to interrupt the control circuit thereby opening the exciting circuit to deenergize the welding generator.

HAROLD J. GRAHAM.

REFERENCES CITED

The following references are of record in the file of this patent:

UNITED STATES PATENTS

| Number | Name | Date |
|---|---|---|
| 1,061,375 | Heany | May 13, 1913 |

FOREIGN PATENTS

| Number | Country | Date |
|---|---|---|
| 362,309 | Italy | Aug. 22, 1938 |